June 23, 1925.
N. H. NORRIS
FLEXIBLE NECK BEARING
Filed March 9, 1923
1,543,025
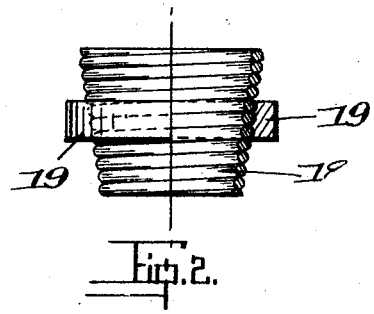
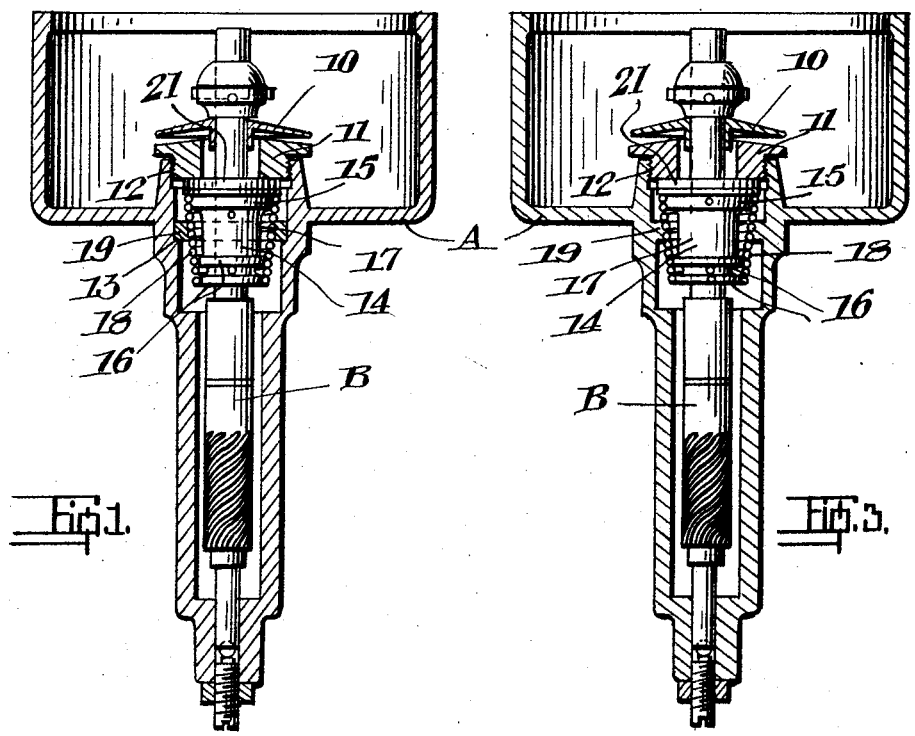
INVENTOR
NELSON. H. NORRIS.

Patented June 23, 1925.

1,543,025

UNITED STATES PATENT OFFICE.

NELSON HOWARD NORRIS, OF RENFREW, ONTARIO, CANADA.

FLEXIBLE NECK BEARING.

Application filed March 9, 1923. Serial No. 623,907.

*To all whom it may concern:*

Be it known that I, NELSON HOWARD NORRIS, a subject of the King of Great Britain, and resident of the town of Renfrew, in the Province of Ontario and Dominion of Canada, have invented certain new and useful Improvements in Flexible Neck Bearings, of which the following is a specification.

This invention relates to improvements in flexible neck bearings and more particularly to bearings of this kind used on cream separators, and the objects of the invention are to provide a specially shaped bearing adapted in combination with a suitably shaped coiled spring to permit the spring to act as a flexible member whereby a flexible and free movement sideways is given to the bearing.

Further objects are the provision of a flexible bearing that will absorb the vibrations of a cream separator bowl when said bowl is revolved at a high rate of speed and not inperfect balance.

In other words, my improved flexible bearing permits and facilitates a flexible action of the bearing and enables it to move freely sideways as well as absorbing the vibrations when in operation.

With the foregoing and other objects in view, the invention consists essentially in the novel arrangement and construction of parts as hereinafter described and illustrated in the accompanying drawings that form part of the present specification.

Referring now to the drawings, in which like characters of reference indicate corresponding parts in each figure, Figure 1 is a vertical section through a casing of a cream separator, showing my improved flexible neck bearing in use.

Figure 2 is a sectional detail of the conical-shaped close coiled spring for the bearing with band cut away.

Figure 3 is a vertical section of a cream separator casing, showing an alternative form of the flexible neck bearing.

In the drawings, A is a cream separator bowl casing and B a spindle mounted therein in any well known manner and here shown as provided with a cap 10 and beneath an engaging member 11 screw-threaded on the outside to engage with the casing at 12 to hold the spindle B in operative position.

We now come to the essential feature of my invention, the flexible neck bearing operatively mounted on the spindle B and comprising a cone-shaped or tapered bearing member 14 formed with a convex head 15 and tapered downwardly and provided adjacent the bottom with bands 16, whereby a substantially centrally recessed portion 17 is formed between said bands and the bottom of the enlarged convex head.

On this centrally recessed portion of the bearing 14 is mounted a conical-shaped close coiled spring 18, taking its bearing at the two extremities thereof.

In combination with this conical spring 18, I use on the outside an inwardly threaded collar member or band 19 adapted to engage with the coils of said spring adapted to support the spring rigidly approximately near the centre on the outside, thereby giving the bearing flexible and free movement sideways and at the same time in operation absorbing the vibrations set up by the rapidly revolving spindle.

The collar 19, as shown in Figure 1, is adapted to engage with a recess 13 in the spindle casing, while in the alternative form of my invention, as illustrated in Figure 3, the collar is formed integral with the spindle casing.

21 is a concaved washer conforming with the convex top of the bearing and is designed for the purpose of creating constant tension upon the bearing, affecting the rigidity of the spring when tightened down or loosened up as the case may be.

From the foregoing, the operation of my improved flexible bearing will be apparent and it will also be apparent that in operation it provides very simple and effective means for securing permanent flexiblity and efficiency in connection with neck bearings or the like and means that will not have to be, as heretofore, constantly renewed.

As many changes could be made in the above construction and many apparently widely different embodiments of my invention within the scope of the claims constructed without departing from the spirit or scope thereof, it is intended that all matter contained in the accompanying specification and drawings shall be interpreted as illustrative and not in a limiting sense.

What I claim as my invention is:

1. A flexible neck bearing comprising, in combination with a spindle, a taper-shaped bearing recessed at the centre and operatively mounted thereon, a coiled spring wound thereon and adapted to take its bearings from the extremities of said spring, a threaded collar for said spring adapted to fit therearound against the coils, and tension-creating washer means for said bearing.

2. In a flexible neck bearing of the character described, the combination with a taper-shaped and centrally recessed bearing, of a tapered and conical spring on said bearing, a threaded collar adapted to fit around the outside of said spring substantially near the centre.

In witness whereof I have hereunto set my hand in the presence of a witness.

NELSON HOWARD NORRIS.

Witness:

W. T. CUFF QUMT.